United States Patent
Hofgesang

[15] 3,671,460

[45] June 20, 1972

[54] DEFOAMING COMPOSITIONS AND METHODS OF PRODUCING SAME

[72] Inventor: Edwin M. Hofgesang, Montclair, N.J.

[73] Assignee: Continental Oil Company, Ponca City, Okla.

[22] Filed: April 29, 1970

[21] Appl. No.: 33,056

[52] U.S. Cl................................252/358, 252/321, 117/100
[51] Int. Cl...........................................................B01d 17/00
[58] Field of Search..........................252/321, 358; 117/100

[56] References Cited

UNITED STATES PATENTS 3,076,768   2/1963   Boylan...................................252/321

OTHER PUBLICATIONS

Chemical Abstracts, Vol. 54, Col. 13723 d

*Primary Examiner*—John D. Welsh
*Attorney*—Joseph C. Kotarski, Henry H. Huth, Robert B. Coleman, Jr., Glen M. Burdick, Carroll Palmer and Kemon, Palmer and Estabrook

[57] ABSTRACT

A defoaming composition is produced by reacting a liquid hydrophobic polysiloxane oil with a hydrophilic alpha alumina monohydrate so as to produce a hydrophobic alumina reaction product. The reaction product is then dispersed in a hydrocarbon medium to produce the defoaming composition. The defoaming composition contains from about 1 to 40 percent by weight of the reaction produce and from about 60 to 99 percent by weight hydrocarbon medium.

10 Claims, No Drawings

DEFOAMING COMPOSITIONS AND METHODS OF PRODUCING SAME

BACKGROUND OF THE INVENTION

1. Field of the Invention

This invention relates to anti-foaming or defoaming compositions for use in aqueous systems. In another aspect this invention relates to new and novel low cost defoaming compositions which are especially adapted to defoam concentrated or dilute black liquor produced during an alkaline or an acid pulping process.

2. Brief Description of the Prior Art

Alkaline pulping processes such as soda and kraft or sulfate processes are currently used in the pulp and paper industry in pulping procedures. One of the reasons for the use of such processes is that the spent chemicals can be reclaimed and reused thus giving an economic advantage over other methods. However, one of the greatest disadvantages of these processes is the troublesome foam which occurs during the pulp washing, screening and knotting operations. This foaming problem is largely attributable to the presence of residual chemicals in the various stages of the pulping process and these chemicals are commonly referred to as black liquor. While a large percentage of the black liquor is removed from the fiber or pulp after the wood chips have been cooked in the digesters, a certain amount of the black liquor remains with the pulp or fiber. The residual black liquor which is present causes foam problems in the screening operation due to violent agitation of the pulp by the screens.

Defoamers are generally used in most alkaline pulp mills during the screening operation so that more efficient screening is accomplished and to prevent the pulp thickeners, utilized after the screening operation, from becoming clogged with entrapped air.

Due to the foaming problem mentioned above, several types of defoamers have been employed by the paper and pulp industry. For example, commercial silica defoamers have been employed which contain a small percentage of a spreading agent which is necessary to allow the silica to spread throughout the aqueous system which is to be defoamed. These spreading agents add appreciably to the cost of the process and/or product in which they are employed. Furthermore, the spreading agents reduce defoaming properties of the silica due to the fact that they produce additional foam in a system which is to be defoamed. In an effort to overcome the use of spreading agents in silica defoamer compositions it has also been suggested to use a defoamer containing a hydrophobic precipitated silica and a hydrocarbon solvent which contains at least six carbon atoms. While these defoamers have met with success in the industry such defoamers are rather expensive thus increasing the cost of the process and/or product in which they are used. Thus, new and novel defoaming compositions are constantly being sought which can effectively reduce the foaming problems which are prevalent in the paper and pulp industry while, at the same time, allowing such defoaming compositions to be produced of relatively inexpensive raw materials.

OBJECTS OF THE INVENTION

An object of the present invention is to provide a novel, inexpensive, defoamer composition which can be employed in aqueous systems.

Another object of the present invention is to provide an improved low cost anti-foam and/or defoaming composition which is especially adapted for controlling foaming in concentrated-diluted black liquor from the alkaline paper pulping process.

Another object of the invention is to provide novel defoaming compositions which may be employed in latex paint systems, low foam detergent formulations, resinous materials, starches, and the production of aqueous latex polymers.

These and other objects, features and advantages of the present invention will become apparent to those skilled in the art from a reading of the following detailed description and appended claims.

SUMMARY OF THE INVENTION

According to the present invention I have discovered new and novel defoamer compositions which contain from about 1 to about 40 weight percent of a reaction product formed by reacting alpha alumina monohydrate and a liquid hydrophobic polysiloxane oil and from about 99 to about 60 percent by weight of an organic hydrocarbon or mixtures of organic hydrocarbons containing at least six carbon atoms.

Further according to the present invention I have found that the above-mentioned defoamer compositions can be prepared by reacting a hydrophilic alumina monohydrate with from about 0.1 to about 40 percent by weight, based on the weight of said alpha alumina monohydrate, of a liquid hydrophobic siloxane oil at a temperature within the range of about 150° to about 350° C. for an effective period of time to produce the reaction product. The reaction product is then admixed with an organic hydrocarbon which can be an aliphatic, alicyclic, aromatic hydrocarbon, or mixtures thereof in a sufficient amount to produce a defoaming composition containing from about 99 to about 60 percent by weight of the organic hydrocarbon and from about 1 to about 40 percent by weight of said reaction of product.

DESCRIPTION OF THE PREFERRED EMBODIMENTS

As indicated above, the method of preparing the defoaming compositions of the present invention is based upon the conversion of a hydrophilic alpha alumina monohydrate to a hydrophobic alumina containing compound by reacting the hydrophilic alpha alumina monohydrate with a liquid hydrophobic polysiloxane oil. The hydrophobic alumina containing compound is then introduced into an aqueous media by means of a hydrocarbon carrier. The organic hydrocarbon carrier can be an aliphatic, aromatic, alicyclic or combination thereof containing at least 6 carbon atoms. The amount of hydrocarbon carrier present in the defoaming composition can vary widely but is generally present in the amount of from about 60 percent to about 99 percent based on the total weight of the defoaming composition.

The reaction conditions employed to convert the hydrophilic alpha alumina monohydrate to the hydrophobic alumina containing compound by the reaction of same with a liquid hydrophobic polysiloxane oil can vary widely. However, generally such reaction is carried out at autogenous pressures and at a temperature within a range of about 150° to 350° C. Under normal operating conditions I have found that the heating period required for the conversion of the hydrophilic alpha alumina monohydrate is dependent upon the temperature. Desirable results have been obtained wherein the reaction is carried out at a temperature within the range of about 200° to 225° C. for a period of time of between 1 and 24 hours. Further, it should be noted that by employing agitation of the reaction mixture the time required for the completion of the reaction can be reduced and thus the conversion of the hydrophilic alpha alumina monohydrate made more efficient.

The liquid hydrophobic polysiloxane oil which is employed to convert the hydrophilic alpha alumina monohydrate as described above may be any alkyl, aryl, alicyclic or aralkyl siloxane or polysiloxane having a viscosity of from about 10 centistokes to 3,000 centistokes at 25° C. Generally the alkyl polysiloxanes are preferred which have viscosities of from 40 centistokes to 1,000 centistokes at 25° C. Typical alkyl polysiloxanes which may be employed to convert the hydrophilic alpha alumina monohydrate to the hydrophobic alpha alumina monohydrate include dimethylpolysiloxane, diethylpolysiloxane, dipropylpolysiloxane, methylethylpolysiloxane, dioctylpolysiloxane, dihexylpolysiloxane, methylpropylpolysiloxane, dibutylpolysiloxane, didodecylpolysiloxane. As is evident all of the polysiloxane compounds recited have viscosities of from about 10 to 3,000 centistokes at 25° C.

The amount of the polysiloxane oil employed in the reaction to convert the hydrophilic alpha alumina monohydrate to the hydrophobic alumina containing reaction product may vary from about 1 to about 40 weight percent based upon the weight of the hydrophilic alpha alumina monohydrate employed in the reaction. As previously stated, this reaction is carried out at a temperature within the range of about 150° to about 350° for an effective period of time to produce the reaction product. The reaction product is then admixed with an aliphatic, alicyclic, aromatic hydrocarbon, or mixtures thereof in a sufficient amount to produce the defoaming composition which contains from about 99 to 60 percent by weight of the organic hydrocarbon and from about 1 to about 40 percent by weight of the reaction product. The hydrocarbons employed in the defoaming composition of this invention are liquids at room temperatures and at atmospheric pressure, have a viscosity of about 30 SUS to 400 SUS (Saybolt Universal Seconds at 100° F.), a minimum boiling point of at least 150° F. and contain from six to about 25 carbon atoms. Hydrocarbons such as benzene, hexane, heptane, octane, mineral seal oil, naptha, napthenic mineral oil, paraffinic oil, mineral oil, and the like can be employed. The above examples are illustrative of compounds which are suitable for use as the liquid hydrocarbon components in the novel defoaming compositions of this invention. If desired, mixture of any two or more of these or similar hydrocarbons can be employed such as the commercial conventional mixtures. In the practice of this invention the liquid aliphatic, alicyclic or aromatic components comprises from about 60 to about 99 percent by weight of the novel defoaming compositions.

When the liquid hydrocarbon is added to the hydrophobic alpha alumina monohydrate, e.g. the reaction product formed by reacting hydrophilic alpha alumina monohydrate with a polysiloxane oil at a temperature within the range of about 150° to 350° C. as described above, a gell-like structure often results. When the hydrophobic alumina containing reaction product particles are in the form of a conglomerate or gell due to the presence of the organic hydrocarbon liquid, it is sometimes necessary to break the gell so as to allow the hydrophobic alumina containing reaction product particles to be easily dispersed into the aqueous system which is to be defoamed. The breaking of the gell may be accomplished by homogenization under pressures of from about 10 pounds per square inch to 8,000 pounds per square inch or by any other suitable means such as ultrasonic mixing. Many other processes such as mixing or grinding may be employed to destroy the gell-like structure of the hydrophobic alpha alumina monohydrate particles.

The defoaming compositions of the invention as described above are especially adapted to defoam aqueous systems which contain foam-producing solids such as latex, glues, resinous materials, starches and the like.

The defoaming compositions are used in amounts of from about 0.01 percent to about 0.5 percent by weight of the dry foam producing solids in the aqueous system. Amounts in excess of about 0.5 percent by weight can be utilized to defoam the aqueous systems but generally such amounts are not practical from an economical standpoint.

The defoaming compositions of the present invention are especially adapted for use in the alkaline pulping process where they produce unexpected and unique defoaming properties. The defoaming compositions can be introduced into the brown stock washers in the third or fourth stage of the washers which contain the concentrated black liquor. The defoaming compositions are thus utilized to control the foaming of the black liquor in the brown stock washers. In addition, because some of the defoaming composition is carried on through the pulping process, control of foaming in other stages of the process is accomplished such as the screening process, where as stated before, foaming is severe. In addition, the defoaming compositions of the present invention may also be utilized in defoaming the dilute black liquor. In these instances the defoaming composition is added to the pulp in the screen room. Thus, foaming of the dilute black liquor in the screening and subsequent paper making operations where foaming is normally severe can be practically eliminated by the utilization of the defoaming compositions disclosed hereinabove.

In In order to illustrate the invention further the following example is set forth. However, the example is given primarily for purposes of illustration; and any enumeration of details contained therein shall not be construed as limitations upon the invention except as such are expressed in the appended claims.

EXAMPLE

This example is directed to producing the defoaming composition of the present invention wherein the reaction product produced by reacting a polysiloxane oil with a hydrophilic alpha alumina monohydrate is admixed with a hydrocarbon medium.

1.8 parts by weight of liquid dimethylpolysiloxane having a viscosity of 50 centistokes at 25° C. was added dropwise to 9 parts by weight of a spray dried, fluid energy milled hydrophilic alpha alumina monohydrate having an average particle diameter of 0.5 micron and a surface area of 300 square meters per gram. During the addition the dimethylpolysiloxane and the hydrophilic alpha alumina monohydrate were agitated by a stirring means. After all the dimethylpolysiloxane was added and visual evidence indicated that all of the liquid polysiloxane had been adsorbed on the hydrophilic alpha alumina monohydrate the resulting mixture, while stirring was continued, was heated to a temperature of about 225° C. for about 3 hours. The reaction product, e.g. hydrophobic alumina, was then dispersed into 89.2 parts by weight of a paraffinic mineral oil having a viscosity of 100 SUS at 100° F. to form the defoaming composition of the present invention.

The defoaming compositions described hereinabove can be employed to reduce foaming problems encountered in the pulp and paper industry, in latex paint systems, detergent formulations, resinous material processing and in the production of aqueous latex polymers.

Having thus described the invention, I claim:

1. A defoaming composition consisting essentially of (a) from about 1 percent to 40 percent by weight of a hydrophilic alpha alumina monohydrate coated with from about 0.1 to 40 weight percent, based on the weight of said alpha alumina monohydrate, of a liquid hydrophobic siloxane oil having a viscosity of from about 10 to 3,000 centistokes at 25° C. and wherein said polysiloxane oil is selected from the group consisting of alkyl polysiloxanes, aryl polysiloxanes, aralkyl polysiloxanes, and alicyclic polysiloxanes, and (b) from about 99 percent to 60 percent by weight of an organic hydrocarbon liquid selected from the group consisting of aliphatic hydrocarbons, alicyclic hydrocarbons, aromatic hydrocarbons, and mixtures thereof, said organic liquid having a boiling point of at least 150° F.

2. The composition of claim 1 wherein said liquid hydrophobic siloxane oil is an alkyl polysiloxane having a viscosity of from 40 to 1000 centistokes at 25° C.

3. The composition according to claim 2 wherein said alkyl polysiloxane is dimethylpolysiloxane, said hydrophilic alpha alumina monohydrate prior to coating with said siloxane oil has an average particle diameter of about 0.5 micron and a surface area of about 300 square meters per gram, and said organic hydrocarbon liquid is a paraffinic mineral oil having a viscosity of 100 SUS at 100° F.

4. A method of preparing a defoaming composition which comprises (a) admixing a hydrophilic alpha alumina monohydrate with from about 0.1 to about 40 weight percent, based on the weight of said alpha alumina monohydrate, of a liquid hydrophobic siloxane oil having a viscosity of from about 10 to 3,000 centistokes at 25° C. and wherein said polysiloxane oil is selected from the group consisting of alkyl polysiloxanes, aryl polysiloxanes, aralkyl polysiloxanes and alicyclic polysiloxanes; (b) heating the mixture of step (a) to a temperature in the range of from about 150° to about 350° C. for an effective period of time to produce a hydrophobic alumina product; and, (c) admixing from about 1 to about 40 percent by weight of said hydrophobic alumina product with about 99 to about 60 weight percent of an organic hydrocarbon liquid having at least six carbon atoms and a minimum boiling point of at least 150° F.

5. The method of claim 4 wherein said heating of the mixture is carried out at a temperature within the range of about 200° to 225° C. for a period of from about 1 to 24 hours.

6. The method of claim 5 which includes the step of continuously agitating said mixture during the addition of said liquid hydrophobic siloxane oil and during said heating of said mixture.

7. The method of claim 5 which includes the step of homogenizing said reaction mixture under pressures of from about 10 pounds per square inch to about 8,000 pounds per square inch to facilitate dispersion of said defoaming composition into an aqueous system to be defoamed.

8. The method of claim 5 wherein said organic hydrocarbon liquid is selected from the group consisting of aliphatic hydrocarbons, alicyclic hydrocarbons, aromatic hydrocarbons, and mixtures thereof, and contains from about six to 25 carbon atoms.

9. The method according to claim 8 wherein said liquid hydrophobic siloxane oil is an alkyl polysiloxane having a viscosity of from 40 to 1,000 centistokes at 25° C.

10. The method according to claim 9 wherein said alkyl polysiloxane is dimethylpolysiloxane, said hydrophilic alpha alumina monohydrate has an average particle diameter of about 0.5 micron and a surface area of about 300 square meters per gram, and said organic hydrocarbon liquid is a paraffinic mineral oil having a viscosity of 100 SUS at 100° F.

* * * * *